US011203666B2

(12) United States Patent
Suzuki et al.

(10) Patent No.: US 11,203,666 B2
(45) Date of Patent: Dec. 21, 2021

(54) CONTINUOUS PRODUCTION METHOD AND CONTINUOUS PRODUCTION APPARATUS FOR AROMATIC CYCLIC OLIGOMER, AND PRODUCTION METHOD FOR AROMATIC POLYMER

(71) Applicant: Kureha Corporation, Tokyo (JP)

(72) Inventors: Kenji Suzuki, Tokyo (JP); Michihisa Miyahara, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/314,527

(22) PCT Filed: Oct. 11, 2018

(86) PCT No.: PCT/JP2018/037916
§ 371 (c)(1),
(2) Date: Dec. 31, 2018

(87) PCT Pub. No.: WO2019/074055
PCT Pub. Date: Apr. 18, 2019

(65) Prior Publication Data
US 2020/0392291 A1 Dec. 17, 2020

(30) Foreign Application Priority Data
Oct. 12, 2017 (JP) .............................. JP2017-198715

(51) Int. Cl.
*C08G 75/14* (2006.01)
(52) U.S. Cl.
CPC ................................... *C08G 75/14* (2013.01)
(58) Field of Classification Search
CPC ......... C08G 75/14; C08J 2381/04; C08J 3/12; B29B 13/00
See application file for complete search history.

(56) References Cited

U.S. PATENT DOCUMENTS 4,477,649 A 10/1984 Mobley
5,792,883 A 8/1998 Harada et al.
(Continued)

FOREIGN PATENT DOCUMENTS

CN 101121786 A 2/2008
CN 104755529 A 7/2015
(Continued)

OTHER PUBLICATIONS

English Translation of International Preliminary Report on Patentability from PCT Application No. PCT/JP2018/037916, dated Apr. 23, 2020, +9 pgs.
(Continued)

*Primary Examiner* — Shane Fang
(74) *Attorney, Agent, or Firm* — Abel Schillinger, LLP

(57) ABSTRACT

Provided are a continuous production method and a continuous production apparatus utilizing the solution polycondensation for aromatic cyclic oligomers, which achieve a good space-time yield and are inexpensive and simple. The continuous production method includes: (a) supplying a polymerization solvent and a reaction raw material to a continuous production apparatus; (b) performing a polymerization reaction in the reaction vessels to form a reaction mixture; (c) removing water in gas phase parts of the reaction vessels from the reaction vessels; and (d) successively moving the reaction mixture to each of the reaction vessels; the steps (a), (b), (c), and (d) being performed in parallel; wherein an amount of the polymerization solvent in the reaction vessel positioned furthest downstream in a movement direction of the reaction mixture is not less than 1 L and not greater than 50 L per 1 mol of arylene units in the reaction raw material.

5 Claims, 2 Drawing Sheets

(56) References Cited

U.S. PATENT DOCUMENTS

| | | | |
|---|---|---|---|
| 8,586,700 | B2 | 11/2013 | Kim et al. |
| 9,567,437 | B2 | 2/2017 | Odashima et al. |
| 2015/0299385 | A1 | 10/2015 | Kamikawa et al. |
| 2015/0329677 | A1 | 11/2015 | Odashima et al. |
| 2017/0158820 | A1 | 6/2017 | Miyahara et al. |
| 2018/0170836 | A1* | 6/2018 | Pelati .................... C07C 5/3332 |
| 2019/0112426 | A1 | 4/2019 | Miyahara et al. |

FOREIGN PATENT DOCUMENTS

| | | | |
|---|---|---|---|
| CN | 104955877 | A | 9/2015 |
| CN | 108779253 | A | 11/2018 |
| EP | 1568727 | A1 | 8/2005 |
| EP | 2 940 060 | A1 | 11/2015 |
| EP | 2937374 | B1 | 6/2018 |
| EP | 3 517 561 | A1 | 7/2019 |
| JP | S62-126231 | A | 8/1987 |
| JP | S64-51433 | A | 2/1989 |
| JP | S64-79231 | A | 3/1989 |
| JP | 08-071395 | A | 3/1996 |
| JP | 08-188558 | A | 7/1996 |
| JP | 10-158222 | A | 6/1998 |
| JP | 2008-285565 | A | 11/2008 |
| JP | 2008-285596 | A | 11/2008 |
| JP | 2011-111548 | A | 6/2011 |
| JP | 4780033 | B2 | 9/2011 |
| JP | 2013527837 | A | 7/2013 |
| KR | 2015-0100685 | A | 9/2015 |
| WO | 2016/021557 | A1 | 2/2016 |
| WO | 2014097564 | A1 | 1/2017 |
| WO | 2014103317 | A1 | 1/2017 |
| WO | 2017/179327 | A1 | 10/2017 |
| WO | 2018/159222 | A1 | 9/2018 |

OTHER PUBLICATIONS

International Search Report for PCT/JP2018/037916 dated Dec. 25, 2018, 10 pgs.
Office Action for Chinese Patent Application No. 201880002558.X dated Dec. 16, 2020, 17 pages.
Office Action from Indian Patent Application No. 201817048427 dated Aug. 31, 2020, 6 pages.
Office Action from KR Application No. 10-2018-7037300, dated Feb. 28, 2020, 16 pgs.
Mitsuru Ueda, Polycondensation—Recent Advancement—, Kobunshi (High Polymer), 2006, vol. 55, April, p. 258-261, w/Partial English Translation.
Office Action for JP Application No. 2018-558362 dated Nov. 19, 2019, 6 pgs.
European Extended Search Report for EP Application No. 18819254.6 dated Dec. 16, 2019, 7 pgs.

* cited by examiner

CONTINUOUS PRODUCTION METHOD AND CONTINUOUS PRODUCTION APPARATUS FOR AROMATIC CYCLIC OLIGOMER, AND PRODUCTION METHOD FOR AROMATIC POLYMER

TECHNICAL FIELD

The present invention relates to a continuous production method and continuous production apparatus for an aromatic cyclic oligomer containing at least one type of heteroatom selected from the group consisting of sulfur, nitrogen, and oxygen, and a production method for an aromatic polymer.

BACKGROUND ART

Various polymers are widely used as crucial industrial materials in a variety of applications such as various industrial materials, textile materials, and construction materials. For example, aromatic polythioethers represented by polyarylene sulfide (PAS); aromatic polysulfones represented by polysulfone (PSU), polyphenyl sulfone (PPSU), and polyether sulfone (PES); aromatic polyetherketones represented by polyether ether ketone (PEEK) and polyether ketone (PEK); and aromatic polymers containing heteroatoms such as sulfur, oxygen, and nitrogen such as aromatic polyether nitrile (PEN) are engineering plastics exhibiting excellent heat resistance, chemical resistance, flame retardancy, mechanical strength, electrical characteristics, dimensional stability, and the like. Because these materials can be molded into various molded products, films, sheets, fibers, and the like by general melt processes such as extrusion molding, injection molding, and compression molding, they are used in a wide range of technical fields such as electric devices, electronic devices, automobile instruments, and packaging materials.

An example of a known production method for such a polymer includes a method of producing an aromatic cyclic oligomer by heating reaction raw materials and then performing ring-opening polymerization on the obtained oligomer (Patent Document 1).

In addition, as a production method for such an aromatic cyclic oligomer, a technique of obtaining a cyclic oligomer by heating reaction raw materials and continuously performing polymerization in a multistage process has been disclosed (Patent Document 2). Further, a technique of obtaining a cyclic oligomer by heating reaction raw materials in an organic polar solvent in the presence of a specific mixed base has also been disclosed (Patent Document 3).

CITATION LIST

Patent Literature

Patent Document 1: JP 2013-527837 T
Patent Document 2: WO 2014/103317
Patent Document 3: WO 2014/097564

SUMMARY OF INVENTION

Technical Problem

An oligomer production method such as that disclosed in Patent Document 2 involves a multistage process using a vessel for performing a water removal step, a raw material vessel for performing an initial reaction step, and a reaction vessel for preparing a reaction mixture, which is complex and requires an expensive production apparatus. In addition, in the oligomer production methods disclosed in Patent Documents 2 and 3, the monomer concentration at the time of charging the raw materials is extremely low, and therefore it takes a long time to obtain a cyclic oligomer mixture from the time of the supply of the raw materials, which is problematic in that the productivity may be diminished.

The present invention was conceived in light of the problems described above, and an object of the present invention is to provide a continuous production method and continuous production apparatus utilizing the solution polycondensation for aromatic cyclic oligomers, which achieves a good space-time yield and are inexpensive and simple.

Solution to Problem

The continuous production method according to the present invention is a continuous production method for an aromatic cyclic oligomer containing at least one type of heteroatom selected from the group consisting of sulfur, nitrogen, and oxygen, the continuous production method including:

(a) supplying a polymerization solvent and a reaction raw material to a continuous production apparatus including a plurality of reaction vessels;

(b) performing a polymerization reaction in the polymerization solvent in at least one of the reaction vessels to form a reaction mixture;

(c) removing at least a part of water in gas phase parts of the reaction vessels from the reaction vessels; and (d) successively moving the reaction mixture to each of the reaction vessels;

the steps (a), (b), (c), and (d) being performed in parallel;
wherein an amount of the polymerization solvent in the reaction vessels positioned furthest downstream in a movement direction of the reaction mixture is not less than 1 L and not greater than 50 L per 1 mol of arylene units in the reaction raw material;
the respective gas phase parts of the plurality of reaction vessels communicate with one another; and
a pressure of each of the gas phase parts is uniform.

In addition, the continuous production apparatus according to the present invention is a continuous production apparatus for an aromatic cyclic oligomer containing at least one type of heteroatom selected from the group consisting of sulfur, nitrogen, and oxygen, the continuous production apparatus including a plurality of reaction vessels; wherein the plurality of reaction vessels are configured such that a reaction mixture successively moves through each of the reaction vessels; and gas phase parts above the reaction mixture in the plurality of reaction vessels communicate with one another.

Advantageous Effects of Invention

One aspect of the present invention can provide a continuous production method and continuous production apparatus utilizing the solution polycondensation for an aromatic cyclic oligomer, which has a good space-time yield and is inexpensive and simple.

DESCRIPTION OF EMBODIMENTS

Embodiments of the present invention will be described in detail hereinafter, but the present invention is not limited to these embodiments.

Embodiment 1

Figure 1:
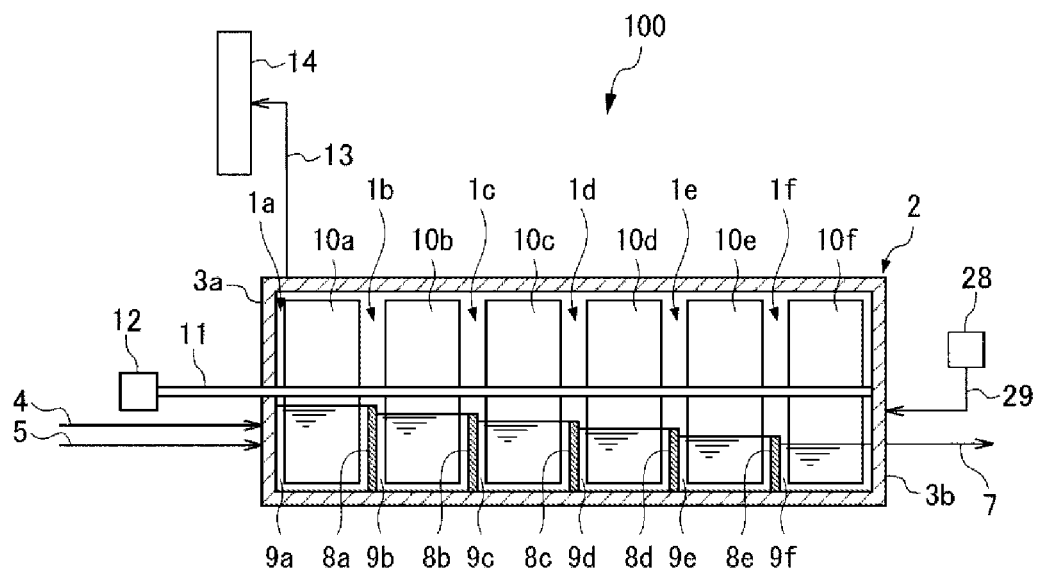
FIG. 1 is a partial cross-sectional view illustrating an embodiment of the continuous production apparatus according to the present invention.

FIG. 1 is a partial cross-sectional view illustrating an embodiment (called "Embodiment 1" hereinafter) of the continuous production apparatus according to the present invention. The configuration of Embodiment 1 will be described hereinafter with reference to FIG. 1.

Continuous Production Apparatus

A continuous production apparatus 100 according to Embodiment 1 includes a housing chamber 2 configured to house six reaction vessels 1a to 1f. The housing chamber 2 is a cylindrical vessel which extends from a reaction raw material supply side to a reaction mixture recovery side. As described below, the continuous production apparatus 100 is configured such that a reaction mixture successively moves through each reaction vessel, and the reaction vessels 1a to 1f are arranged in order of reaction vessels 1a, 1b, 1c, 1d, 1e, and 1f along the direction in which the reaction mixture successively moves from the reaction raw material supply side to the reaction mixture recovery side.

The shape of the housing chamber 2 is a hollow cylindrical shape put down on its side, where a side wall 3a in contact with the reaction vessel 1a and a side wall 3b in contact with the reaction vessel 1f are the bottom faces of the hollow cylindrical shape. Note that the shape of the housing chamber 2 is not limited to this shape, and may be a hollow rectangular prism or the like that is put down on its side.

A polymerization solvent supply line 4 configured to supply a polymerization solvent to the reaction vessel 1a in the housing chamber 2 continuously or intermittently; and a reaction raw material supply line 5 configured to supply raw materials such as monomers to the reaction vessel 1a in the housing chamber 2 continuously or intermittently are connected to the side wall 3a of the housing chamber 2. Note that some or all of the reaction raw materials may be supplied to the target reaction vessel after being mixed in advance. In addition, a plurality of reaction raw material supply lines 5 may be provided for each raw material.

A water supply line configured to supply water to the housing chamber 2 may also be connected as necessary. A reaction mixture recovery line 7 configured to recover a reaction mixture from the housing chamber 2 is connected to the side wall 3b of the housing chamber 2. The solvent and various raw materials may be supplied to a liquid phase of the reaction vessel 1a via a gas phase part, or may be supplied directly to the liquid phase of the reaction vessel 1a.

In addition, a temperature control device (not illustrated) such as a heater configured to adjust the temperature for each reaction vessel may be connected to the wall face of the housing chamber 2. Thus, the temperatures of the reaction vessels 1a to 1f may be increased from the upstream side toward the downstream side in the movement direction of the reaction mixture, for example.

Further, an additional supply line (not illustrated) configured to supply a polymerization solvent to at least one of the reaction vessels 1b to 1f continuously or intermittently may be additionally connected to the side wall of the housing chamber 2. The polymerization solvent may be additionally supplied to the liquid phases of the reaction vessels 1b to 1f via the gas phase parts, or may be additionally supplied directly to the liquid phases of the reaction vessels 1b to 1f.

The plurality of reaction vessels housed in the housing chamber 2 are isolated by a given isolation means such that the reaction vessels communicate with one another via the gas phase part of the housing chamber. In FIG. 1, the reaction vessels 1a to 1f are separated by partition walls 8a to 8e provided at the lower part of the housing chamber 2. The reaction vessels 1a to 1f communicate with one another via the gas phase part in the housing chamber 2. For example, the raw material mixture in the reaction vessel 1a moves over the partition wall 8a and into the reaction vessel 1b.

The reaction vessels 1a to 1f are connected in series in the order described above. Note that in each reaction vessel excluding the reaction vessel 1a furthest upstream in the movement direction of the reaction mixture, the minimum height of the partition wall on the upstream side in the movement direction is higher than the maximum liquid surface level of that reaction vessel. That is, in the reaction vessel 1b, the minimum height of the partition wall 8a on the upstream side in the movement direction is higher than the maximum liquid surface level of the reaction vessel 1b, and in the reaction vessel 1c, the minimum height of the partition wall 8b on the upstream side in the movement direction is higher than the maximum liquid surface level of the reaction vessel 1c. In this way, the minimum heights of the partition walls 8c to 8e on the upstream side in the movement direction are higher than the maximum liquid surface levels of the respective reaction vessels 1d to 1f on the downstream side. As a result, a backward flow from reaction vessels on the downstream side to reaction vessels on the upstream side, such as a backward flow from the reaction vessel 1b to the reaction vessel 1a or a backward flow from the reaction vessel 1c to the reaction vessel 1b, is prevented. The reaction vessels 1a to 1f can house the respective reaction mixtures 9a to 9f.

In this way, in a preferred embodiment of the continuous production apparatus according to an embodiment of the present invention, the reaction vessels may be configured so that at least one set among the combinations of adjacent reaction vessels is sequentially connected in order of the highest maximum liquid surface level of a liquid that can be housed by the reaction vessels, and the reaction mixture moves from a reaction vessel with a higher maximum liquid surface level to a reaction vessel with a lower maximum level. In this specification, "sequentially connected" means that all of the vessels are preferably connected in series, but some of the vessels may be connected in parallel.

With this configuration, the reaction mixture moves in accordance with gravity and the difference in the liquid surface level. Thus, it is unnecessary to provide a separate means for moving the reaction mixture to the next reaction vessel, which makes it possible to achieve a simple apparatus configuration.

In the housing chamber 2, stirring blades 10a to 10f configured to stir the reaction mixtures 9a to 9f in the reaction vessels 1a to 1f are installed on the same stirring shaft 11. The stirring shaft 11 is installed to pass through the side wall 3a from the outside of the housing chamber 2 and to reach the side wall 3b. A rotary driving device 12 configured to rotate the stirring shaft 11 is installed at the end of the stirring shaft 11 on the side wall 3a side.

One end of a discharge line 13 is connected near the side wall 3a of the housing chamber 2. A water removing unit 14 configured to remove water from the gas phase in the housing chamber 2 is connected to the other end of the discharge line 13.

A gas feeding unit 28 which communicates with the gas phase in the housing chamber 2 and feeds an inert gas to the gas phase from the downstream side toward the upstream side in the movement direction of the reaction mixture—that is, from the reaction vessel 1c toward the reaction vessel 1a—is connected to the side wall 3b of the housing chamber 2 via gas feeding line 29. The inert gas is not particularly limited, and examples thereof include noble gases such as argon; and nitrogen.

In addition, a reaction mixture recovery line 7 is further connected to the side wall 3b of the housing chamber 2. The reaction mixture recovered from the reaction mixture recovery line 7, if necessary, after minute amounts of solids immixed in the reaction mixture is separated and removed by filtration or the like from the reaction mixture, is subjected to further purification operation or a ring-opening polymerization reaction or the like as necessary.

Aromatic Cyclic Oligomer to be Produced

This production method is a continuous production method for an aromatic cyclic oligomer containing at least one type of heteroatom selected from the group consisting of sulfur, nitrogen, and oxygen. The aromatic cyclic oligomer is suitably used as a raw material for an aromatic polymer.

Aromatic cyclic oligomers and aromatic cyclic polymers are oligomers and polymers containing repeating units including at least one arylene group. An arylene group is a divalent group derived from a monocyclic or polycyclic aromatic hydrocarbon, and examples thereof include any arylene groups such as phenylene, biphenylene, and naphthylene. In this specification, arylene groups in the monomers serving as raw materials for aromatic cyclic oligomers and polymers; and individual arylene groups in the repeating units in aromatic cyclic oligomers are called arylene units. Note that in a case where two aromatic rings are bonded directly, as in the case of biphenyl, the entire unit is considered a single arylene unit. On the other hand, in a case where two aromatic rings are bonded via another atom, as in the case of diphenyl sulfide, the entire unit is not considered a single unit, but is rather considered a unit with two arylene units. For example, in the case of 4,4'-difluorobenzophenone, there are 2 mol of arylene units per 1 mol of the monomers. A plurality of arylene units contained in an oligomer or a polymer may be the same as or different than one another.

In addition, in this specification, an oligomer refers to a substance in which the number of repeating units is from 2 to 100.

Specific examples of aromatic cyclic oligomers include aromatic cyclic thioether oligomers having thioether bonds, which are bonds of aromatic rings and sulfur, and aromatic cyclic ether oligomers having ether bonds, which are bonds of aromatic rings and oxygen.

Aromatic thioether oligomers include oligomers further containing at least one group from among ketone groups and sulfone groups in addition to aromatic rings and thioether bonds. Specifically, aromatic thioether oligomers include arylene sulfide cyclic oligomers having thioether bonds, which are bonds of aromatic rings and sulfur, and more specifically, aromatic thioether oligomers include polyphenylene sulfide cyclic oligomers. In addition, aromatic cyclic thioether oligomers include polyphenylene sulfide ketone cyclic oligomers and polyphenylene sulfide ketone ketone cyclic oligomers further containing ketone groups in addition to thioether bonds, which are bonds of aromatic rings and sulfur. Aromatic cyclic thioether oligomers also include polyphenylene sulfide sulfone cyclic oligomers further containing sulfone groups in addition to thioether bonds, which are bonds of aromatic rings and sulfur. In addition, aromatic cyclic thioether oligomers include polyphenylene sulfide ketone sulfone cyclic oligomers further containing ketone groups and sulfone groups in addition to thioether bonds, which are bonds of aromatic rings and sulfur.

In addition to aromatic cyclic ether oligomers primarily including aromatic rings and ether bonds, aromatic cyclic ether oligomers also include aromatic cyclic sulfone oligomers further containing sulfone groups in addition to aromatic rings and ether bonds; aromatic cyclic ether ketone oligomers further containing ketone groups in addition to aromatic rings and ether bonds; nitrogen-containing aromatic cyclic ether oligomers in which groups containing nitrogen bond to aromatic rings in addition to aromatic rings and ether bonds; and aromatic cyclic imide oligomers further containing imide groups in addition to aromatic rings and ether bonds. Note that aromatic cyclic thioether oligomers, aromatic cyclic ether oligomers, aromatic cyclic sulfone oligomers, aromatic cyclic ether ketone oligomers, and nitrogen-containing aromatic cyclic ether oligomers can be suitably produced by desalting polycondensation reactions. In addition, aromatic cyclic imide oligomers can be produced by dehydrative polycondensation reactions.

When a plurality of types of bonds coexist in an oligomer, the oligomer is classified as an aromatic cyclic oligomer corresponding to the bond with the highest molar content ratio.

From the perspective of the ease of production by the method of the present invention, aromatic cyclic thioether oligomers and aromatic cyclic ether oligomers are preferable from among these examples.

Aromatic cyclic thioether oligomers can produce aromatic polythioethers by means of ring-opening polymerization, and are therefore suitably used as raw materials for aromatic polythioethers. Specific examples of aromatic polythioethers are polyarylene sulfides (PAS), and more specifically include polyphenylene sulfide (PPS), polyphenylene sulfide ketone (PPSK), polyphenylene sulfide ketone ketone (PPSKK), polyphenylene sulfide sulfone (PPSS), and polyphenylene sulfide ketone sulfone (PPSKS).

Aromatic cyclic ether oligomers can produce aromatic polyethers by means of ring-opening polymerization, and are therefore suitably used as raw materials for aromatic polyethers. Specific examples of aromatic polyethers include aromatic polysulfones such as polysulfone (PSU), polyphenyl sulfone (PPSU), and polyether sulfone (PES) having sulfone groups in addition to aromatic rings and ether bonds. Additional examples include polyaryl ether ketones (PAEK) having ketone groups in addition to aromatic rings and ether bonds. Specific examples include polyether ether ketone (PEEK), polyether ketone (PEK), polyether ketone ketone (PEKK), polyether ether ketone ketone (PEEKK), and polyether ketone ether ketone ketone (PEKEKK). In addition, examples of oligomers in which groups containing nitrogen bond with aromatic rings include polyether nitriles (PEN) further having nitriles groups bonded to aromatic rings in addition to aromatic rings and ether bonds.

An aromatic cyclic imide oligomer obtained by dehydrative polycondensation is used as a raw material for an aromatic polyimide. Specific examples of aromatic polyimides include thermoplastic polyimides such as polyether imides (PEI) including, for example, Auram (trade name) produced by Mitsui Chemical Co., Ltd. and Ultem (trade name) produced by SABIC IP; and polyamide imides (PAI). Aromatic polyimides also include, but are not limited to, substances containing ether bonds, ketone bonds, and amide bonds in addition to imide bonds formed by dehydrative polycondensation reactions.

The weight average molecular weight (Mw) of the aromatic cyclic oligomer obtained by the present embodiment is ordinarily not greater than 20000, preferably not greater than 10000, and more preferably not greater than 5000. The Mw can be analyzed by high-performance liquid chromatography or gel permeation chromatography (GPC). The column, column temperature, solvent, and the like are selected appropriately.

The number of repeating units in the aromatic cyclic oligomer obtained by the present embodiment is not lower than 2 and preferably not lower than 3, and the upper limit is not greater than 50, preferably not greater than 30, and particularly preferably not greater than 20.

An aromatic cyclic oligomer having the number of repeating units described above can be analyzed by component division using high-performance liquid chromatography or gel permeation chromatography (GPC) or with a mass spectrometer such as MALDI-TOF-MS. The analysis conditions are selected appropriately.

Continuous Production Method for Aromatic Cyclic Oligomer

Next, the continuous production method for an aromatic cyclic oligomer according to the present embodiment will be described concurrently with a description of the operation of the continuous production apparatus.

This production method includes: (a) supplying a polymerization solvent and a reaction raw material to a continuous polymerization apparatus including a plurality of reaction vessels; (b) performing a polymerization reaction in the polymerization solvent in at least one of the reaction vessels to form a reaction mixture; (c) removing at least a part of water in gas phase parts of the reaction vessels from the reaction vessels; and (d) successively moving the reaction mixture to each of the reaction vessels; and the steps (a), (b), (c), and (d) are performed in parallel. Further, the amount of the polymerization solvent in the reaction vessel positioned furthest downstream in the movement direction of the reaction mixture is adjusted to not less than 1 L and not greater than 50 L per 1 mol of arylene units in the reaction raw material.

This production method will be described in detail hereinafter. In a supply step, a polymerization solvent and reaction raw materials are supplied to the reaction vessel 1a in the housing chamber 2 via the polymerization solvent supply line 4 and the reaction raw material supply line 5. The reaction raw materials and the polymerization solvent may be supplied separately from respective supply lines, or may be supplied after some or all are mixed in advance.

Examples of polymerization solvents, in particular, polycondensation reaction solvents include organic polar solvents such as any solvent selected from the group consisting of N,N-dialkylformamides such as N,N-dimethylformamide, N,N-diethylformamide, and N,N-dipropylformamide; N,N-dialkylacetamides such as N,N-dimethylacetamide, N,N-diethylacetamide, and N,N-dipropylacetamide; caprolactams or N-alkyl caprolactams such as ε-caprolactam, N-methyl caprolactam, N-ethyl caprolactam, and N-propyl caprolactam; pyrrolidones, N-alkyl pyrrolidones, or N-cycloalkyl pyrrolidones such as 2-pyrrolidone, N-methyl-2-pyrrolidone (NMP), N-ethyl-2-pyrrolidone, N-propyl-2-pyrrolidone, and N-cyclohexyl-2-pyrrolidone; N,N-dialkylimidazolidinones such as N,N'-dimethylimidazolidinone, N,N'-diethylimidazolidinone, and N,N'-dipropylimidazolidinone; tetraalkylureas such as tetramethylurea; hexaalkylphosphate triamides such as hexamethylphosphate triamide; sulfones such as sulfolane(1,1-dioxothiolane), dimethyl sulfone, diethyl sulfone, diisopropyl sulfone, and diphenyl sulfone; sulfoxides such a dimethyl sulfoxide and diethyl sulfoxide; and mixtures thereof. Organic polar solvents that are liquids at room temperature are preferable.

Examples of polymerization solvents for an arylene sulfide cyclic oligomer that are preferable from the perspective of being able to efficiently obtain a cyclic oligomer include N-alkyl caprolactams, N-alkyl pyrrolidones or N-cycloalkyl pyrrolidones, and N-dialkyl imidazolidinones. N-ethyl-2-pyrrolidone and N-methyl-2-pyrrolidone are more preferable.

Examples of polymerization solvents for an aromatic cyclic sulfone oligomer that are preferable from the perspective of being able to efficiently obtain a cyclic oligomer include N-alkyl-2-pyrrolidones, N-cycloalkyl pyrrolidones, N-alkyl caprolactams, N,N'-dialkyl imidazolidinones, N-alkyl caprolactam, dimethylsulfoxide, and sulfolane. More preferable are N-ethyl-2-pyrrolidone, N-methyl-2-pyrrolidone, N-methyl caprolactam, sulfolane, and dimethylsulfoxide. Particularly preferable are N-methyl-2-pyrrolidone, dimethylsulfoxide, and sulfolane.

Examples of polymerization solvents for an ether ether ketone cyclic oligomer or an ether nitrile cyclic oligomer that are preferable from the perspective of being able to efficiently obtain a cyclic oligomer include N-alkyl-2-pyrrolidones, 2-cycloalkyl pyrrolidones, N-alkyl caprolactams, N,N'-dialkyl imidazolidinones, N-alkyl caprolactam, sulfone, and dimethylsulfoxide. N-ethyl-2-pyrrolidone, N-methyl-2-pyrrolidone, N-methyl caprolactam, sulfolane, and dimethylsulfoxide are more preferable. N-methyl-2-pyrrolidone, and sulfolane are particularly preferable.

In an embodiment of the present invention, one type of a polymerization solvent may be used alone, or two or more types thereof may be used in combination.

In addition, a polymerization solvent may be additionally supplied to any one or a plurality of the reaction vessels 1b to 1f positioned on the downstream side in the movement direction of the reaction mixture via an additional supply line. Additional supply of a polymerization solvent yields the effect of increasing the yield of the aromatic cyclic oligomer. The polymerization solvent that is additionally supplied may be the same as or different than the polymerization solvent supplied from the polymerization solvent supply line 4.

In each of the reaction mixtures 9a to 9f housed in each of the reaction vessels 1a to 1f, the ratio of the polymerization solvent to the reaction raw materials is preferably such that the polymerization solvent is present in an amount from 1 to 50 L per 1 mol of arylene units in the reaction raw materials; and more preferably such that the polymerization solvent is present in an amount from 1.5 to 20 L per 1 mol of arylene units in the reaction raw materials. In each reaction mixture, the cyclization polymerization (ring-closing polymerization) of the monomers can be advanced by setting the ratio of the polymerization solvent and the reaction raw materials to within this range. Note that when a polymerization solvent is additionally supplied, the polymerization solvent is supplied from each supply line such that the amount of the polymerization solvent is from 1 to 50 L per 1 mol of arylene units in the reaction raw materials in each of the reaction mixtures 9b to 9f housed in each of the reaction vessels 1b to 1f.

When a polymerization solvent is not additionally supplied, the polymerization solvent and the reaction raw materials are supplied from each supply line such that the amount of the polymerization solvent is from 1 to 50 L per 1 mol of arylene units in the reaction raw materials. Alternatively, the polymerization solvent and the reaction raw materials may be supplied to the reaction vessel 1a after having been mixed in advance to the ratio described above.

In a case where a polymerization solvent is additionally supplied to any one of the reaction vessels 1b to 1f positioned on the downstream side in the movement direction, the amounts supplied from the polymerization solvent supply line 4, the reaction raw material supply line 5, and the additional supply line are adjusted such that the ratio of the polymerization solvent and the reaction raw materials is as described above in the reaction mixture in the reaction vessel to which the polymerization solvent is additionally supplied. Specifically, in the step of supplying the polymerization solvent and the reaction raw materials to the reaction vessel 1a, the polymerization solvent and the reaction raw materials are continuously or intermittently supplied from the polymerization solvent supply line 4 and the reaction raw material supply line 5 at a ratio such that the amount of the polymerization solvent per 1 mol of arylene units in the reaction raw materials is less than 1 L, and more preferably at a ratio such that the amount of the polymerization solvent per 1 mol of arylene units in the reaction raw materials is from 0.1 to 0.7 L. On the other hand, for reaction mixtures in the reaction vessels positioned on the downstream side, the reaction raw material concentration is diluted by additional supply of a polymerization solvent from the additional supply line such that the amount of the polymerization solvent is from 1 to 50 L and preferably from 1.5 to 20 L per 1 mol of arylene units in the reaction raw materials. As illustrated next, when the amount of the polymerization solvent supplied to the reaction vessel 1a is set to less than 1 L per 1 mol of arylene units and additionally a polymerization solvent is supplied to the reaction vessel 1b and subsequent reaction vessels, a cyclization reaction can be performed more efficiently. However, even in a case where a polymerization solvent is additionally supplied to the reaction vessel 1b and subsequent reaction vessels, the amount of the polymerization solvent supplied to the reaction vessel 1a may be not less than 1 L per 1 mol of arylene units.

In a case where a polymerization solvent is additionally supplied to any one of the reaction vessels 1b to 1f positioned on the downstream side in the movement direction, the polymerization solvent is preferably additionally supplied to the reaction vessel 1b.

In a case where the reaction raw material concentration of the reaction mixture is set to a high level in reaction vessels positioned on the upstream side in the movement direction and a polymerization solvent is additionally supplied to reaction vessels positioned on the downstream side, the reaction raw material concentration in the reaction mixture is lowered, and thereby cyclization polymerization can be allowed to progress efficiently. That is, the initial reaction rate is set to a high level while lowering the monomer concentration as polymerization progresses at the time of charging the raw materials, and thereby self-cyclization reactions can be allowed to progress preferentially over further polymerization.

The solvent and various raw materials that are supplied to the reaction vessel 1a in the supply step are first mixed in the reaction vessel 1a in the polymerization step, and a reaction mixture 9a is formed as a result of a polymerization reaction performed in the polymerization solvent. Note that in some cases, the configuration may be such that only water removal is performed while the polymerization reaction makes essentially no progress in the reaction vessel 1a, and the polymerization reaction progresses in the reaction vessel 1b and beyond.

Note that water may be added to at least one of the reaction vessels 1a to 1f. The amount of water added at this time can be adjusted appropriately in accordance with the amount of reaction raw materials.

In this production method, at least a part of the water inside the housing chamber 2 is removed from the housing chamber 2 via the gas phase in the housing chamber 2 due to the action of the water removing unit 14 (details given below) through the discharge line 13 in the water removal step. As a result, at least a part of the water present in the reaction vessels 1a to 1f is removed. The water inside the housing chamber 2 may be water that is supplied to the housing chamber 2. Here, the water that is supplied to the housing chamber 2 refers to water that is intentionally supplied to the housing chamber 2 and, when water is not intentionally supplied to the housing chamber 2, water that is ordinarily supplied to the housing chamber 2 together with the reaction raw materials while contained in the raw materials. Water has a high steam pressure, and therefore, when the water content of the gas phase of the housing chamber 2 is high, the inside of the housing chamber 2 tends to assume a high pressure, and the housing chamber 2 needs to be made pressure-resistant, which makes it difficult to achieve resource conservation, equipment cost reduction, and the like. In addition, it is preferable to reduce the water content to a degree that does not inhibit the polymerization reaction. Examples of methods of removing water with the water removing unit 14 are water removal by heating and water removal by depressurization. In the case of water removal by heating, heating is performed at preferably from 100 to 270° C., more preferably from 140 to 250° C., and even more preferably from 150 to 235° C. In the case of water removal by depressurization, water is preferably removed at 60 to 200° C., more preferably from 80 to 180° C., and even more preferably from 100 to 170° C. By removing water with the water removing unit 14 to reduce the pressure inside the housing chamber 2, resource conservation, equipment cost reduction, and the like can be realized effectively, and the water removal reaction can be performed smoothly.

The polymerization temperature of arylene sulfide cyclic oligomers, ether ether ketone cyclic oligomers, and ether nitrile cyclic oligomers is ordinarily not lower than 120° C., preferably not lower than 170° C., and more preferably not lower than 200° C. The upper limit is ordinarily not greater than 300° C., preferably not greater than 290° C., and more preferably not greater than 280° C.

The polymerization temperature of aromatic sulfone oligomers is ordinarily not lower than 120° C., preferably not lower than 160° C., and more preferably not lower than 170° C. The upper limit is ordinarily not greater than 260° C., preferably not greater than 240° C., and more preferably not greater than 220° C.

The pressure inside the housing chamber 2, which is the reaction system, can be reduced to a pressure at which the solvent that is supplied does not boil, and although the pressure differs depending on the temperature of each reaction vessel, the pressure may be reduced to a gauge pressure of around 0.3 MPa, for example, or to a gauge pressure of around 0.2 MPa. In addition, the pressure may be preferably reduced to a gauge pressure of around 0.04 MPa, to a pressurized state with a gauge pressure of around 0.0001 MPa, or to a gauge pressure of 0 MPa. Although a negative gauge pressure may also be established, a pressurized state is preferable from the perspective of the energy cost of generating a negative pressure or a reduction in the boiling point of the solvent.

As described above, the reaction vessels $1a$ to $1f$ communicate with one another via the gas phase in the housing chamber 2, and the pressure of the gas phase in the housing chamber 2 is uniform. Therefore, water is removed from each of the reaction vessels $1a$ to $1f$ by the water removing unit 14 in the water removal step. Accordingly, the amount of water in the reaction mixture decreases from the reaction vessel $1a$ toward the reaction vessel $1f$. That is, from the upstream side toward the downstream side in the movement direction of the reaction mixture. As a result, the inhibition of the reaction by water is suppressed, and the cyclization polymerization reaction is accelerated. In addition, the boiling point of the reaction mixture increases, and a reaction thereby may be carried out at a high temperature, which further accelerates the cyclization polymerization reaction. The acceleration in the polymerization reaction facilitates an increase in the temperature of the reaction mixture, which further accelerates the cyclization polymerization reaction.

As described above, in the continuous production apparatus 100, each part may be disposed as described above, for example, and the temperatures of the reaction vessels $1a$ to $1f$ may be increased from the upstream side toward the downstream side in the movement direction over the entire course of performing continuous reactions. In other words, the internal temperatures of the reaction vessels $1a$ to $1f$ can be set so as to be higher from the upstream side toward the downstream side in the movement direction of the reaction mixture.

In addition, as described above, the reaction vessels $1a$ to $1f$ are connected in order of the highest maximum liquid surface level of a liquid that can be housed by each reaction vessel. As a result, in the reaction mixture moving step, the reaction mixture can be successively moved using the difference in the maximum liquid surface level. More specifically, when the heights of the reaction mixtures $9a$ to $9e$ exceed the maximum liquid surface levels of the respective reaction vessels, they may flow over the respective partition walls $8a$ to $8e$. By successively moving the reaction mixture using the difference in the maximum liquid surface level, the reaction mixture is moved by gravity, and therefore a large amount of energy is unnecessary. As a result, it becomes easy to achieve resource conservation, energy conservation, equipment cost reduction, and the like. Note that as long as the communication between the reaction vessels $1a$ to $1f$ via the gas phase in the housing chamber 2 is not inhibited, the shapes of the partition walls $8a$ to $8e$ are not particularly limited, and any shape may be used. In addition, the configuration may also be such that the reaction solution moves through an opening part such as a through-hole or slit (neither illustrated in the drawings) formed in the partition wall.

In the present embodiment, an inert gas is preferably fed to the gas phase in the housing chamber 2 by the gas feeding unit 28 from the downstream side toward the upstream side in the movement direction of the reaction mixture. That is, from the reaction vessel $1f$ toward the reaction vessel $1a$. As described above, in order to maintain a state in which the amount of water in the reaction mixture decreases from the upstream side toward the downstream side in the movement direction of the reaction mixture, it is preferable to use a configuration in which the moisture evaporated from the reaction mixture does not flow to the downstream side and condense on the reaction mixture. Feeding the inert gas to the gas phase with the gas feeding unit 28 as described above effectively prevents water vapor from flowing to the downstream side and condensing on the reaction mixture.

The stirring shaft 11 is rotated by the rotary driving device 12, and in a step with this rotation, the stirring blades $10a$ to $10f$ installed on the stirring shaft 11 rotate around the stirring shaft 11 such that the reaction mixtures $9a$ to $9f$ are stirred. The stirring blades $10a$ to $10f$ are installed on the same stirring shaft 11. Therefore, by simply rotating the stirring shaft 11 with the rotary driving device 12, all of the stirring blades $10a$ to $10f$ can be rotated under the same conditions, which makes it possible realize uniform stirring with high efficiency. Note that in the present invention, a case in which the stirring shaft 11 is a single shaft is indicated, but multiple shafts such as 2 or 3 or more shafts may be used.

In a case where the cyclization polymerization reaction is a desalting polycondensation reaction, salts such as alkali metal halides are precipitated in association with the progress of the cyclization polymerization reaction. When salts accumulate at the base of the reaction vessel, the effective volume for advancing a sufficient polymerization reaction decreases, which tends to cause a decrease in productivity or the like. In addition, excessive maintenance operations configured to remove the accumulated salts become necessary. By stirring the reaction mixture with the stirring blades, the salts can be easily dispersed in the reaction mixture, moved to the reaction vessel $1f$ on the downstream side, and then discharged to the outside of the housing chamber. On the other hand, in a case where stirring is too intense, the reaction mixture tends to flow over the partition walls and become unnecessarily immixed in the reaction vessel on the downstream side from the reaction vessel on the upstream side.

In the reaction vessels $1a$ to $1f$, the shape, number, rotational speed, and the like of the stirring blades are preferably adjusted appropriately such that the dispersion of solids such as salts can be promoted and the unnecessary immixing of the reaction mixture between reaction vessels can be avoided. Of these, the rotational speed of the stirring blades may be such that the stirring speed of the stirring blades is not lower than the floating particle limit stirring speed under conditions in which solids are not sedimented, more specifically, with a provided shape and the number of stirring blades of the vessels. Note that the upper limit of the rotational speed is preferably a speed at which the rotational speed of the stirring blades is not greater than 120 rpm and more preferably a speed at which the rotational speed of the stirring blades is not greater than 60 rpm from the perspective of more easily preventing the reaction mixture from flowing over the partition wall. In addition, the rotational path or the like of the stirring blades may also be adjusted appropriately so that stirring is performed sufficiently. For example, the stirring blades preferably have a shape that allows the blades to pass through the vicinity of the base so that solids are not sedimented.

Exhaust from the housing chamber 2 is supplied to the water removing unit 14 via the discharge line 13. The water removal unit 14 functions as a distillation column, for example, wherein a liquid containing the polymerization solvent as a primary component is recovered from one end (for example, the lower part), and various raw materials and steam containing water are recovered from the other end (for example, the upper part).

The polymerization solvent recovered from the water removing unit 14 may be resupplied to the housing chamber 2 as a reaction raw material for the polymerization reaction after purification or the like as necessary such that the ratio relative to the reaction raw materials is in the range described above. The supply destination of the recovered polymerization solvent may be any one of the reaction vessels 1a to 1f or may be a combination of two or more thereof.

In addition, the movement or the like of the reaction mixture is achieved using gravity to drive the continuous production apparatus 100 based on the difference in maximum liquid surface level and the sedimentation of solids, and thus a large amount of energy is unnecessary. Therefore, the continuous production apparatus 100 can easily achieve resource conservation, energy conservation, and equipment cost reduction.

Further, with this production method, the reaction raw materials are only required to be supplied to at least one of the plurality of reaction vessels communicating with one another via the gas phase, so complex control or the like is unnecessary, and the production of an aromatic cyclic oligomer polymer becomes easy.

Note that although a continuous production method for an aromatic cyclic oligomer using a specific apparatus was described in the present embodiment, the production method of the present invention may further include other steps as long as at least a plurality of reaction vessels in communication with one another via a gas phase are used, the method includes the supply step, polymerization step, water removal step, movement step, and resupplying step in some cases, and these steps are performed simultaneously and in parallel.

In addition, although reaction vessels with a specific shape are used in the present embodiment, the shape of the reaction vessels is not particularly limited.

Further, the number of reaction vessels in the present embodiment is not particularly limited. The reaction vessels are also not necessarily connected in series as described in FIG. 1. Accordingly, some of the plurality of reaction vessels may be arranged in parallel, for example.

In addition, at least one pair of adjacent reaction vessels among the plurality of reaction vessels are such that the reaction vessel with the higher maximum liquid surface level of a liquid that can be housed by each reaction vessel is positioned on the upstream side in the direction in which the reaction mixture moves, and the reaction mixture is preferably moved using the difference in maximum liquid surface level. As a result, the movement of the reaction mixture is achieved using gravity in the at least one pair of reaction vessels, so it is possible to achieve resource conservation, energy conservation, equipment cost reduction, and the like.

Further, in the present embodiment, the feeding step of feeding an inert gas is preferably performed simultaneously and in parallel with each of the steps described above. In addition, the separation and recover step of separating and recovering some of the reaction raw materials and the resupply step of supplying at least some of the raw materials to at least one of the reaction vessels are preferably performed simultaneously and in parallel with the steps described above.

Moreover, although a configuration in which the reaction raw materials are supplied to the reaction vessel 1a was described in the present embodiment, the reaction vessel to which the reaction raw materials are fed is not specified.

Embodiment 2

Figure 2:
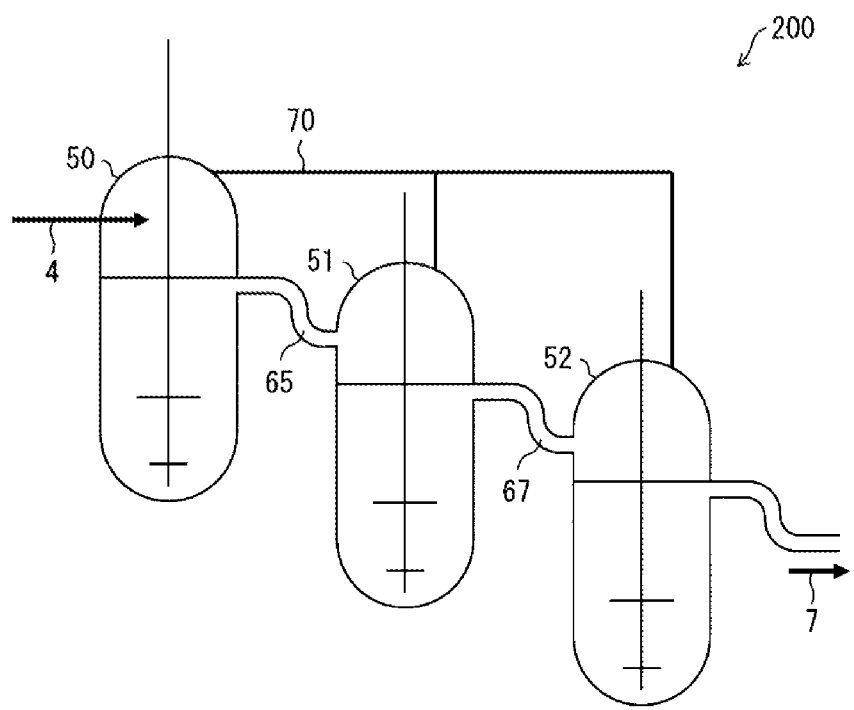
FIG. 2 is a partial cross-sectional view illustrating another embodiment of the continuous production apparatus according to the present invention.

Next, another example of a continuous production apparatus will be described using FIG. 2. FIG. 2 schematically illustrates another example of the configuration of a continuous production apparatus.

Referring to FIG. 2, a continuous production apparatus 200 includes a first reaction vessel 50, a second reaction vessel 51, and a third reaction vessel 52. The second reaction vessel 51 is disposed below the first reaction vessel 50 in the vertical direction, and the third reaction vessel 52 is disposed below the second reaction vessel 51 in the vertical direction.

The first and second reaction vessels 50 and 51 are connected by a first pipe 65. In addition, the second and third reaction vessels 51 and 52 are connected by a second pipe 67.

A polymerization solvent and reaction raw materials are supplied from a supply line 4 to the first reaction vessel 50, and the first pipe 65 is provided such that when the reaction mixture in the first reaction vessel 50 exceeds the maximum liquid surface level, the reaction mixture moves through the first pipe 65 to the second reaction vessel 51. In addition, the second pipe 67 is provided such that when the reaction mixture in the second reaction vessel 51 exceeds the maximum liquid surface level, the reaction mixture moves through the second pipe 67 to the third reaction vessel 52. Solids are discharged by sedimentation from the lower part of the washing part at the base of the third reaction vessel 52, and the purified reaction mixture and washing solution are recovered from a reaction mixture recovery line 7.

A ventilation unit 70 is connected to each of the first through third reaction vessels 50 to 52. The first through third reaction vessels 50 to 52 communicate through the ventilation unit 70 via a gas phase.

With the configuration of such a continuous production apparatus 200, the same effect as in Embodiment 1 can be achieved by successively moving the reaction mixture using the difference in maximum liquid surface level of each of the first and second reaction vessels 50 and 51. Further, with the continuous production apparatus 200, it is unnecessary to provide partition walls as illustrated in Embodiment 1.

The polymerization solvent and reaction raw materials may be supplied to the first reaction vessel 50 while a polymerization solvent is additionally supplied to the second reaction vessel 51 and/or the third reaction vessel 52 via an additional supply line (not illustrated), continuously or intermittently. In a case where a polymerization solvent is additionally supplied, the polymerization solvent is preferably additionally supplied to the second reaction vessel 51.

The ratio of the polymerization solvent to the reaction raw materials in each of the reaction mixtures in each of the reaction vessels is as described in Embodiment 1.

Embodiment 3

Figure 3:
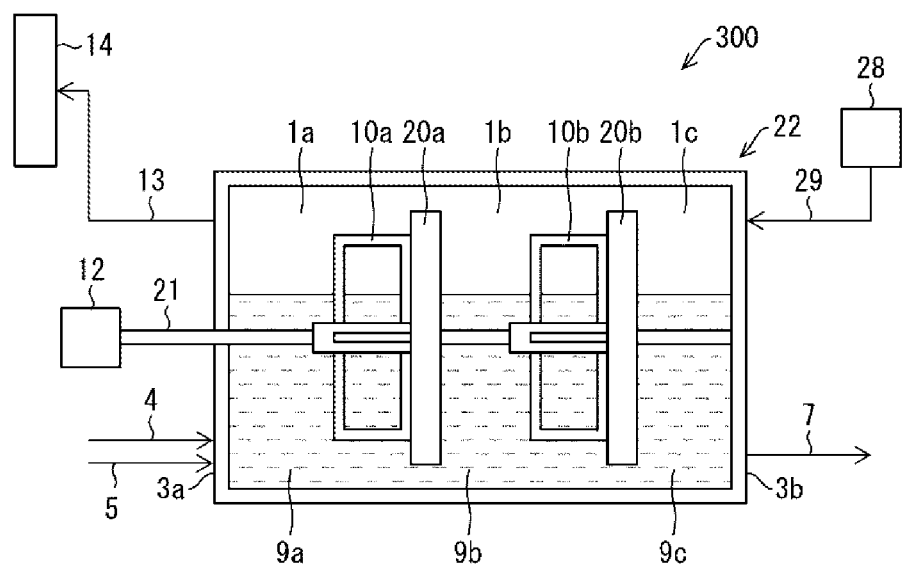
FIG. 3 is a partial cross-sectional view illustrating another embodiment of the continuous production apparatus according to the present invention.

Yet another example of a continuous production apparatus will be described using FIG. 3. FIG. 3 schematically illustrates another example of the configuration of a continuous production apparatus.

Referring to FIG. 3, a continuous production apparatus 300 differs from Embodiment 1 in that inside a housing chamber 22 of Embodiment 1, the isolating means for isolating the reaction vessels is not a partition wall, but rather a partition plate having a rotational center.

In the present embodiment, the reaction vessel 1a and the reaction vessel 1b are separated by a partition plate 20a, and reaction vessel 1b and the reaction vessel 1c are separated by a partition plate 20b. The reaction vessels 1a, 1b, and 1c communicate with one another via a gas phase part in the housing chamber 22.

In addition, a stirring blade 10a configured to stir a reaction mixture 9a in the reaction vessel 1a is attached to one side of the partition plate 20a. Similarly, a stirring blade 10b configured to stir a reaction mixture 9b in the reaction vessel 1b is attached to one side of the partition plate 20b. Note that in contrast to the stirring blades 10a and 10b in the embodiment described above, the stirring blades 10a and 10b in the present embodiment have a structure in which an opening is provided on the inside.

The partition plates 20a, 20b and the stirring blades 10a, 10b are both installed on the same rotation shaft 21. The rotation shaft 21 is installed so as to pass through the side wall 3a from outside the housing chamber 22 and to reach the side wall 3b. The rotary driving device 12 configured to rotate the rotation shaft 21 is installed at the end of the rotation shaft 21 on the side wall 3a side.

Note that the stirring blades can be installed at any position with respect to the partition plates. The partition plates may be on the upstream side or the lower side of the stirring blades, or there may be a combination thereof. The partition plates may be distanced from the stirring blades, but adhering and linking the partition plates as illustrated in FIG. 3 is preferable in that the partition plates can be fixed and reinforced. In addition, the stirring blades and partition plates do not necessarily need to be provided in pairs, and there may be areas in which there is no stirring blade between adjacent partition plates. By providing at least one stirring blade, it is possible to assist the progression of the polymerization reaction and to ensure the smooth movement of solids in the reaction mixture. Alternatively, the stirring blades may not be provided, which makes it possible to achieve an even simpler apparatus configuration.

The shape of the partition plates is not particularly limited and may be any shape which has a rotational center and provides clearance or openings of a prescribed width so that a vertical cross-sectional surface in the housing chamber 22 can be partially blocked and so that adjacent reaction vessels communicate with one another. For example, when the housing chamber 22 is a hollow cylindrical shape, as illustrated in FIG. 3, the partition plates may have a disc-like shape with radius that is a size smaller than the internal space of the housing chamber. Note that the shape of the partition plates is not limited to this and the partition plates may not have a central axis. When the partition plates do not have a central axis, a plurality of partition plates may form a basket-like rotating body by connecting adjacent partition plates via a mesh-like member, for example. The basket-like rotating body is provided with a rotation shaft on the outer partition plate (partition plate positioned closest to the side wall 3b side, and the rotation shaft can be rotated so as to rotate each partition plate even without a rotation axis in the inside of the partition plate.

The number of partition plates provided on the rotation shaft may be any number greater than or equal to 1 in accordance with the size of the housing chamber, the type of the polymerization reaction, and the like.

When two or more partition plates are provided, the shapes thereof may be the same or different.

In addition, the position of each partition plate is not particularly limited, and the partitions may be provided at any positions.

On the other hand, the shape of the stirring blades is not particularly limited and may be any shape in which the reaction mixture can be stirred when provided coaxially with the partition plates. As illustrated in FIG. 3, the stirring blades 10 may be attached to either side of the partition plate 20 or may be attached to both sides. The stirring blades may also be attached to the rotation shaft 21 separately from the partition plates.

The reaction vessels liquid phase parts of the 1a to 1c communicate with one another. As a result, the polymerization solvent and reaction raw materials supplied to the reaction vessel 1c successively move to the reaction vessels 1b and 1c while advancing the polymerization reaction as a reaction mixture.

The polymerization solvent and reaction raw materials may be supplied to the reaction vessel 1a while a polymerization solvent is additionally supplied to the reaction vessel 1b and/or the reaction vessel 1c via an additional supply line (not illustrated), continuously or intermittently.

The ratio of the polymerization solvent to the reaction raw materials in each of the reaction mixtures in each of the reaction vessels is as described in Embodiment 1.

The reaction mixture that successively moves through the reaction vessels is recovered from the reaction mixture recovery line 7.

Solids such as salts precipitated by the reaction in each of the reaction vessels do not accumulate at the base of the reaction vessel, but rather move together with the reaction mixture and are discharged to the outside of the housing chamber 22. Accordingly, a reduction in the reaction space of the reaction vessels can be prevented.

In addition, the gas phase parts of the reaction vessels 1a to 1c communicate with one another. As a result, the pressure of the gas phase in the housing chamber 22 is uniform. The evaporation components generated at the time of polymerization in each of the reaction vessels successively move from the reaction vessel 1c in the direction of 1b and 1a via the gas phase part due to the temperature difference or the like in the apparatus.

In the continuous production apparatus 300 in the present embodiment, a clearance of a prescribed width exists between the inner wall of the housing chamber 22 and each of the outer edges of the partition plates 20a to 20b. As a result, the gas phase parts and the liquid phase parts of adjacent reaction vessels respectively communicate with one another, and the reaction mixture, gas containing evaporation components, and the like move through the gas phase parts and the liquid phase parts. Note that openings such as through-holes or slits, for example, may be provided in the partition plates instead of providing clearance so as to allow the reaction vessels to communicate through the openings. Alternatively, both a clearance and opening parts may be provided. Alternatively, the partition plates may have a mesh shape with a plurality of fine through-holes.

The width of the clearance or the size of the opening part is not particularly limited and may be set appropriately in accordance with the shape of the vessel or the shape and number of the partition plates. The proportion of the cross-sectional area of the clearance or opening part occupying the vertical cross-section of the internal space of the reaction vessel is from 1 to 50%, preferably from 3 to 30%, and more preferably from 5 to 20%. When the proportion of the cross-sectional area of the clearance or opening part is within the range described above, the countercurrent of reaction mixtures containing solids and volatile components can be prevented, and the movement can be controlled.

With the exception of the points described above, Embodiment 3 is as described in Embodiment 1.

When a polymerization solvent is additionally supplied, the polymerization solvent is preferably additionally supplied to the reaction vessel 1b.

Embodiment 4

Next, yet another example of a continuous polymerization apparatus will be described.

In the continuous production apparatus (not illustrated) according to Embodiment 4, a plurality of reaction vessels are disposed adjacently in the vertical direction inside a housing chamber. The adjacent reaction vessels are separated by fixed partition plates without gaps so that a reaction mixture moves successively through connection pipes from a reaction vessel on the upper side to a reaction vessel on the lower side. In addition, the gas phase parts of the respective reaction vessels communicate with one another by communication pipes. Therefore, the pressure of the gas phase of each reaction vessel in the housing chamber is roughly the same. The communication pipes connecting the gas phase parts may have a form in which the connection pipes, through which the reaction mixture successively moves, also function as communication pipes, or they may be pipes provided separately from the connection pipes.

Here, a case in which a first reaction vessel and a second reaction vessel are provided sequentially from the upper side in the vertical direction will be described as a specific example. The first and second reaction vessels communicate via a first connection pipe, and the pipe wall of the first connection pipe projects into the first reaction vessel. The height of the pipe wall of the first connection pipe is equal to the maximum liquid surface level of a liquid that can be housed by the first reaction vessel. The first connection pipe passes through a first partition plate which separates the first and second reaction vessels.

In a continuous production apparatus with such a configuration, when the height of the reaction mixture exceeds the maximum liquid surface level of the first reaction vessel, the reaction mixture flows over the pipe wall of the first connection pipe and into the first connection pipe, and it then flows into the second reaction vessel via the first connection pipe. Such a continuous production apparatus may be configured so that the reaction mixture is moved successively.

In addition, in the first and second reaction vessels, the gas phase part of the first reaction vessel communicates with the gas phase part of the second reaction vessel via a connection pipe or a communication pipe.

SUMMARY

According to a first aspect of the present invention, the continuous production method according to the present invention is a continuous production method for an aromatic cyclic oligomer containing at least one type of heteroatom selected from the group consisting of sulfur, nitrogen, and oxygen, the continuous production method including: (a) supplying a polymerization solvent and a reaction raw material to a continuous production apparatus including a plurality of reaction vessels;

(b) performing a polymerization reaction in the polymerization solvent in at least one of the reaction vessels to form a reaction mixture;

(c) removing at least a part of water in gas phase parts of the reaction vessels from the reaction vessels; and (d) successively moving the reaction mixture to each of the reaction vessels;

the steps (a), (b), (c), and (d) being performed in parallel;

wherein an amount of the polymerization solvent in the reaction vessels positioned furthest downstream in a movement direction of the reaction mixture is not less than 1 L and not greater than 50 L per 1 mol of arylene units in the reaction raw material;

the respective gas phase parts of the plurality of reaction vessels communicate with one another; and a pressure of each of the gas phase parts is uniform.

With the configuration described above, a reaction mixture obtained as the polymerization reaction progresses in each reaction vessel successively passes through each reaction vessel, and evaporation components generated in each reaction vessel can move through the communicating gas phase parts in accordance with the temperature difference between the reaction vessels. With this configuration, since the gas phase parts communicate with one another, the pressure of each gas phase part can be controlled to a uniform level with a simple method, which allows the evaporation of the solvent from the reaction mixture to be controlled and accelerates the cyclization reaction. In addition, by adjusting the ratio of the reaction raw materials to the polymerization reaction, a cyclic oligomer can be produced efficiently.

According to a second aspect of the present invention, the aromatic cyclic oligomer in the first aspect described above is preferably an aromatic thioether oligomer and an aromatic cyclic ether oligomer.

According to a third aspect of the present invention, the method in the first or second aspect described above preferably further includes (e) additionally supplying the polymerization solvent to at least one of the reaction vessels other than the reaction vessel positioned furthest upstream in the movement direction of the reaction mixture.

According to a fourth aspect of the present invention, an amount of the polymerization solvent in the reaction vessel positioned furthest upstream in the movement direction of the reaction mixture in the third aspect described above is preferably less than 1 L per 1 mol of arylene units in the reaction raw materials.

With the configuration described above, cyclization reactions can be allowed to progress preferentially by additionally supplying a solvent from an intermediate step while accelerating the initial reaction by increasing the monomer concentration at the time of charging the raw materials.

According to a fifth aspect of the present invention, a method of producing an aromatic polymer using an aromatic cyclic oligomer produced by the continuous production method described in any one of the first through fourth aspects described above is provided.

According to a sixth aspect of the present invention, the continuous production apparatus according to the present invention is a continuous production apparatus for an aromatic cyclic oligomer containing at least one type of heteroatom selected from the group consisting of sulfur, nitrogen, and oxygen, the continuous production apparatus including a plurality of reaction vessels; wherein the plurality of reaction vessels are configured such that a reaction mixture successively moves through each of the reaction vessels; and gas phase parts above the reaction mixture in the plurality of reaction vessels communicate with one another.

With the configuration described above, cyclization reactions can be allowed to progress efficiently with a simple and inexpensive apparatus configuration.

According to a seventh aspect of the present invention, the reaction vessels in the sixth aspect described above are preferably connected in order of the highest maximum liquid surface level of a liquid that can be housed by each of the reaction vessels, and the reaction mixture preferably moves successively using a difference in the liquid surface level.

With configuration described above, the reaction mixture moves in accordance with gravity and the difference in the liquid surface level, and thus it is unnecessary to provide a separate means for moving the reaction mixture to the next reaction vessel, which makes it possible to achieve a simple apparatus configuration.

According to an eighth aspect of the present invention, the apparatus of the sixth aspect described above preferably further includes a housing chamber, wherein the plurality of reaction vessels are housed in the housing chamber; each of the plurality of reaction vessels preferably includes one or more partition walls provided on the lower part in the housing chamber; the maximum liquid surface level of a liquid that can be housed by each of the reaction vessels is preferably defined by a height of the partition walls; the reaction vessels are preferably connected in order of the highest maximum liquid surface level of a liquid that can be housed by each of the reaction vessels; and the reaction mixture preferably moves successively using a difference in the liquid surface level.

With the configuration described above, a plurality of reaction vessels communicate with one another via the gas phase of the housing chamber, which enables a simple apparatus structure and facilitates maintenance.

According to a ninth aspect of the present invention, the apparatus of the sixth or seventh aspect described above preferably further includes a housing chamber, wherein the plurality of reaction vessels are housed in the housing chamber; and each of the plurality of reaction vessels is preferably isolated by one or more partition plates having a rotational center inside the housing chamber.

With the configuration described above, a plurality of reaction vessels are separated by partition plates having a rotational center. When performing maintenance on the apparatus, a partition plate is pulled out of the housing chamber. The remaining housing chamber has a simple hollow structure, and thus washing and maintenance can be performed easily with a small number of man-hours.

Note that in the ninth aspect described above, it is more preferable for the rotational center to be the rotation shaft; for the rotational center to be one rotation shaft straddling the plurality of reaction vessels and the one or more partition plates to be provided on the one rotation shaft; or for the apparatus to further include stirring blades having the same rotational center as the partition plates.

Embodiments of the present invention will be described in further detail hereinafter using examples. Of course, the present invention is not limited to the following examples, and it goes without saying that various modes are possible for the details. Further, the present invention is not limited to the embodiments described above, and various modifications are possible within the scope indicated in the claims. Embodiments obtained by appropriately combining the technical means disclosed by the embodiments are also included in the technical scope of the present invention. In addition, all documents cited in this specification are incorporated by reference.

EXAMPLES

Example 1

A continuous production apparatus for an aromatic cyclic oligomer including 6 reaction vessels (1a to 1f) formed by partitioning a housing chamber 2 with 5 partition walls (8a to 8e) was used. The continuous production apparatus was a titanium reaction apparatus having dimensions of 108 mm (inner diameter)×300 mm (length) and including semicircular partition walls provided between the respective reaction vessels. The continuous production apparatus further includes a donut-shaped semicircular baffle (outer diameter: 108 mm, inner diameter: 16 mm) in the gas phase part above the partition wall 8e between the fifth (1e) and sixth (1f) reaction vessels from the upstream side, and the total area of the opening part was 2 $cm^2$.

1300 g of N-methyl-2-pyrrolidone (NMP) was charged as an organic amide solvent into the continuous production apparatus for an aromatic cyclic oligomer described above. Then, nitrogen gas was fed from the downstream side of the fifth partition wall (8e), a temperature 1 of a portion partitioned by the first partition wall (8a) and the second partition wall (8b) counted from the upstream side (second reaction vessel (1b) from the upstream side) was maintained at 240° C., and a temperature 2 of a portion partitioned by the third partition wall (8c) and the fourth partition wall (8d) (fourth reaction vessel (1d) from the upstream side) was maintained at 260° C. by an external heater installed at the base of the housing chamber. In addition, the temperature of a portion partitioned by the fifth partition wall (8e) and the side wall of the housing chamber 2 (sixth reaction vessel (10 from the upstream side) was maintained at 220° C.

A mixture of NMP and p-dichlorobenzene (pDCB) was supplied at a flow rate of 12.87 g/min (NMP:pDCB (weight ratio)=941:59) and 36.40 wt. % of NaSH was supplied at a flow rate of 0.78 g/min from each supply line to the reaction vessel (1a) on the upstream side of the first partition wall (8a) from the upstream side using a constant-flow pump.

Simultaneously, water was continuously removed from the continuous production apparatus using a distillation device connected to the continuous production apparatus for an aromatic cyclic oligomer while controlling the pressure to a gauge pressure of 0.32 MPa with a pressure adjustment valve, and the pDCB in the water that was removed was separated with a settler and returned to the continuous production apparatus.

In addition, an exhaust gas from the distillation apparatus was washed with 14.55 wt. % of NaOH supplied to a gas absorption column at 1.47 g/min and NMP supplied to a gas absorption column at 0.62 g/min; and then discharged. At this time, the total amounts of the NaOH aqueous solution and NMP that absorbed the gas were supplied to the reaction vessel (1a) on the upstream side of the first partition wall (8a) from the upstream side.

The retention time of the reaction mixture in the housing chamber calculated from the amounts of raw materials supplied in the above operation and the effective volume thereof was estimated to be 1 hour. In addition, the amount of the polymerization solvent NMP in the reaction vessel positioned furthest downstream in the movement direction of the reaction mixture was estimated to be 2.5 L (in terms of specific gravity at room temperature) per 1 mol of arylene units in the reaction raw materials.

After the above operation was continued for five hours, the resulting reaction mixture was collected and analyzed. The conversion ratio of the raw material pDCB according to gas chromatography was 74.7%. The reaction mixture was placed in water of five times the weight of the reaction mixture, stirred, and then filtered. The resulting cake was washed and filtered three times with water of five times the weight of the cake, and the resulting cake was dried for 8 hours at 80° C. in a vacuum to obtain a powder containing a PPS cyclic oligomer.

The weight average molecular weight Mw of the powder in terms of polystyrene according to GPC was 8500.

When this powder was extracted with chloroform, the extracted amount was 5.53 wt. %. As a result of subjecting the extract to field desorption mass spectrometry, the proportion of the total peak strength assigned as a PPS cyclic oligomer to the total peak strength of all detected peaks was not lower than 98%. Therefore, the yield of the PPS cyclic oligomer with respect to the raw material pDCB was 4.13 wt. %. In addition, the Mw was estimated to be greater than 300 and not greater than 1500.

Example 2

The continuous production apparatus for an aromatic cyclic oligomer used in Example 1 was used. In addition, the retention temperature of each vessel was the same as in Example 1.

A mixture of NMP and pDCB was supplied at a flow rate of 3.02 g/min (NMP:pDCB (weight ratio)=612:388) and 36.50 wt. % of NaSH was supplied at a flow rate of 1.20 g/min from each supply line to the reaction vessel (1a) on the upstream side of the first partition wall (8a) from the upstream side using a constant-flow pump. In addition, NMP was supplied at a flow rate of 17.23 g/min to the reaction vessel (1c) of the portion partitioned by second partition wall (8b) and the third partition wall (8c) from the upstream side.

Simultaneously, water was continuously removed from the continuous production apparatus using a distillation apparatus connected to the continuous production apparatus for an aromatic cyclic oligomer while controlling the pressure to a gauge pressure of 0.32 MPa with a pressure regulating valve, and the pDCB in the water that was removed was separated with a settler and returned to the continuous production apparatus.

In addition, an exhaust gas from the distillation apparatus was washed with 17.09 wt. % of NaOH supplied to a gas absorption column at 1.92 g/min and NMP supplied to a gas absorption column at 0.50 g/min; and then discharged. At this time, the total amounts of the NaOH aqueous solution and NMP that absorbed the gas were supplied to the reaction vessel (1a) on the upstream side of the first partition wall (8a) from the upstream side.

The retention time of the reaction mixture in the housing chamber calculated from the amounts of raw materials supplied in the above operation and the effective volume thereof was estimated to be 1 hour. In addition, the amount of the polymerization solvent NMP in the reaction vessel positioned furthest upstream in the movement direction of the reaction mixture was estimated to be 0.3 L (in terms of specific gravity at room temperature) per 1 mol of arylene units in the reaction raw materials. Further, the amount of the polymerization solvent NMP in the reaction vessel positioned furthest downstream in the movement direction of the reaction mixture was estimated to be 2.5 L (in terms of specific gravity at room temperature) per 1 mol of arylene groups in the reaction raw materials.

The above operation was continued for five hours, and the resulting reaction mixture was collected and analyzed. The conversion rate of the raw material pDCB according to gas chromatography was 81.93%. The reaction mixture was added into water of five times the weight of the reaction mixture, stirred, and then filtered. The resulting cake was washed and filtered three times with water of five times the weight of the cake, the resulting cake was dried for 8 hours at 80° C. in a vacuum, and thereby a powder containing a PPS cyclic oligomer was obtained.

The weight average molecular weight Mw of the powder in terms of polystyrene according to GPC was 4000.

The powder was extracted with chloroform, and the extracted amount was 11.79 wt. %. As a result of subjecting the extract to field desorption mass spectrometry, the proportion of the total peak strength assigned as a PPS cyclic oligomer to the total peak strength of all detected peaks was not lower than 98%. Therefore, the yield of the PPS cyclic oligomer relative to the raw material pDCB was 9.66 wt. %. In addition, the Mw was estimated to be greater than 300 and not greater than 1300.

Note that in Examples 1 and 2, weight average molecular weight and field desorption mass spectrometry measurements were taken using the following measurement methods.

Weight Average Molecular Weight

The weight average molecular weight (Mw) of the polymer was measured using a high temperature gel permeation chromatograph (GPC) SSC-7101, available from Senshu Scientific, Co., Ltd., under the following conditions. The weight average molecular weight was calculated in terms of polystyrene.

Solvent: 1-chloronaphthalene
Temperature: 210° C.
Detector: UV detector (360 nm),
Sample injection amount: 200 μL (concentration: 0.05 mass %)
Flow rate: 0.7 mL/min
Standard polystyrene: five types of standard polystyrenes of 616000, 113000, 26000, 8200, and 600

Field Desorption Mass Spectrometry

Field desorption mass spectrometry (FD-MS) was performed on the extract under the following conditions using a JMS-T100GCV available from JEOL Ltd.

Sample: diluted with chloroform
Ionization mode: FD+
Analysis m/z range: 29.00 to 3000.00
Molecular weight distribution calculation software: Polymerix In addition, in Examples 1 and 2, the extraction with chloroform was performed by the following method using an ASE150 high-speed solvent extraction apparatus available from Dionex.

Sample amount: 3 g
Solvent: chloroform
Temperature: 120° C.
Settling time: 3 min
Amount of washing solvent: 17 mL
Number of washing cycles: 2 cycles
Purge time: 100 sec The solvent of the extract was distilled out, and the weight of the precipitated solid content was measured. The extracted amount was calculated in accordance with the following equation.

Extracted amount(wt. %)=weight of solid content(g)/sample amount (g)×100

REFERENCE SIGNS LIST

1a, 1b, 1c, 1d, 1e, 1f: Reaction vessel
2, 22: Housing chamber
3a, 3b: Side wall 4: Reaction solvent supply line
5: Reaction raw material supply line
7: Reaction mixture recovery line
8a, 8b, 8c, 8d, 8e: Partition wall
9a, 9b, 9c, 9d, 9e, 9f: Reaction mixture
10a, 10b, 10c, 10d, 10e, 10f: Stirring blade
11: Stirring shaft
12: Rotary driving device
13: Discharge line
14: Water removing unit
20a, 20b: Partition plate
21: Rotation shaft
28: Gas feeding unit
29: Gas feeding line
50: First reaction vessel
51: Second reaction vessel
53: Third reaction vessel
65: First pipe
67: Second pipe
70: Ventilation unit
100, 200, 300: Continuous production apparatuses

The invention claimed is:

1. A continuous production method for an aromatic cyclic oligomer containing at least one type of heteroatom selected from the group consisting of sulfur, nitrogen, and oxygen, the continuous production method comprising:
   (a) supplying a polymerization solvent and a reaction raw material to a continuous production apparatus including a plurality of reaction vessels;
   (b) performing a polymerization reaction in the polymerization solvent in at least one of the reaction vessels to form a reaction mixture;
   (c) removing at least a part of water in gas phase parts of the reaction vessels from the reaction vessels; and
   (d) successively moving the reaction mixture to each of the reaction vessels;
   the steps (a), (b), (c), and (d) being performed in parallel;
   wherein an amount of the polymerization solvent in the reaction vessels positioned furthest downstream in a movement direction of the reaction mixture is not less than 1 L and not greater than 50 L per 1 mol of arylene units in the reaction raw material;
   the respective gas phase parts of the plurality of reaction vessels communicate with one another; and
   a pressure of each of the gas phase parts is uniform; and
   the plurality of reaction vessels are connected in series.

2. The continuous production method according to claim 1, wherein the aromatic cyclic oligomer is an aromatic thioether oligomer and an aromatic cyclic ether oligomer.

3. The continuous production method according to claim 1, further comprising (e) additionally supplying the polymerization solvent to at least one of the reaction vessels other than the reaction vessel positioned furthest upstream in the movement direction of the reaction mixture.

4. The continuous production method according to claim 3, wherein an amount of the polymerization solvent in the reaction vessel positioned furthest upstream in the movement direction of the reaction mixture is less than 1 L per 1 mol of arylene units in the reaction raw material.

5. A method of producing an aromatic polymer using an aromatic cyclic oligomer, wherein the aromatic cyclic oligomer is produced by the continuous production method described in claim 1.

* * * * *